United States Patent [19]
Catt et al.

[11] 3,891,703
[45] June 24, 1975

[54] SULFAMIDE PROCESS

[75] Inventors: John D. Catt; William L. Matier, both of Evansville, Ind.

[73] Assignee: Mead Johnson & Company, Evansville, Ind.

[22] Filed: Sept. 20, 1973

[21] Appl. No.: 399,025

[52] U.S. Cl. 260/556 N; 260/247.1 R; 260/283 SA; 260/293.85; 260/294.8 F; 260/326.12 R; 260/326.5 SF; 260/465 E; 260/465.5 R; 260/470; 260/518 R
[51] Int. Cl............................................ C07c 143/72
[58] Field of Search..................... 260/556 N, 556 A

[56] References Cited
OTHER PUBLICATIONS

Protective Groups in Organic Chemistry – McOmie Plenum Press, (1973), page 196, QD 335.M3.

Justus Liebigs Ann. Chem., (1968), 715:196–203, Losse et al.

Handbook of Chemistry & Physics, 35th Ed., 1953–1954, Chemical Rubber Publ. Co., pages 700–701.

*Primary Examiner*—Henry R. Jiles
*Assistant Examiner*—S. D. Winters
*Attorney, Agent, or Firm*—Robert E. Carnahan; Robert H. Uloth

[57] ABSTRACT

A process for preparing primary or secondary sulfamides under mild conditions which avoid halogenation or acylation of sensitive organic substituents involving cleavage of a substituted N-tert.-butyl sulfamide with trifluoroacetic acid is provided.

7 Claims, No Drawings

SULFAMIDE PROCESS

FIELD OF THE INVENTION

This invention is concerned with the preparation of carbocyclic, acyclic, and heterocyclic carbon compounds which are derivatives of sulfamic acid, namely, sulfamides bearing at least one hydrogen atom on a sulfamide nitrogen atom.

DESCRIPTION OF THE PRIOR ART

Known methods for the synthesis of primary and secondary sulfamides, that is sulfamides having 1 or 2 hydrogen atoms on a single sulfamide nitrogen atom, include reaction of (a) sulfamoyl chloride with amines, (b) heating sulfamide or o-nitrophenylsulfamide with amines with the expulsion of ammonia or o-nitroaniline, and (c) reacting substituted sulfamoyl chlorides with ammonia or primary amines. Methods (a) and (b) often give poor yields, or none of the desired product. Sulfamoyl chloride, required in Method (a), is expensive and must be stored under refrigeration. Method (b) involves rather drastic reaction conditions of high temperature. Method (c) although versatile is limited by the unavailability of substituted sulfamoyl chlorides of certain types, particularly in the aromatic carbocyclic and aromatic heterocyclic series. Reagents used to prepare substituted sulfamoyl chlorides such as sulfuryl chloride and sulfur trioxide are also chlorinating or sulfonating agents, and thus react with organic groups which are subject to halogenation or sulfonation.

Due to the ready availability of tert.-butyl sulfamoyl chloride and its facile and predictable reactivity with amines of all types, it is possible to prepare substituted tert.-butyl sulfamides in good yield by reaction thereof with primary and secondary amines and heterocyclic nitrogen compounds. The present invention is based on the discovery that the tert.-butyl group may be cleaved from substituted tert.-butyl sulfamides by reaction thereof at room temperature or below with trifluoroacetic acid, thus making possible the preparation of sulfamides which are heretofore unavailable and making available at lower cost many known sulfamides having various utilities. Although the tert.-butyl group is known to serve as a blocking group in the synthesis of other functional types of molecule, its removal has generally required rather destructive conditions such as hot aqueous acid.

Aromatic carbocyclic primary sulfamides such as N-(2-phenoxyethyl)sulfamide, N-(1-phenyl-2-propyl)sulfamide, N-(2-phenylethyl)-sulfamide, N-[2-(3,4-dichlorophenyl)ethyl]-N-propargylsulfamide, -N-propargylsulfamide, N-benzyl-N-isopropylsulfamide and N-(2-indanyl)sulfamide are known compounds having utilities variously as tranquilizers, sedatives, anticonvulsants, antispasmodics, etc. Refer, for example to U.S. Pat. Nos. 3,143,549, 3,406,174, and 3,383,414 as well as to various foreign patents including German Pat. No. 1,933,158 (Chem. Abstracts, 74, 3404y (1971)), Belgian Patent No. 640,160 (Chem. Abstracts, 62, 116134e (1965)), and Netherlands Patent Application No. 6,500,481 (Chem. Abstracts, 64, 6567a (1966)). The synthetic methods disclosed in those patents involve pyrolytic displacement of ammonia from sulfamide by the respective primary and secondary aromatic carbocyclic amines.

SUMMARY OF THE INVENTION

In its broadest concept, this invention involves a method for the preparation of N-substituted sulfamides bearing from 1 to 3 hydrogen atoms and from 1 to 3 other organic groups on the sulfamide nitrogen atoms thereof. The products produced by the process are N-substituted sulfamides, N,N-disubstituted sulfamides including those wherein the sulfamide nitrogen atom is part of a heterocyclic ring, N,N'-disubstituted sulfamides, and N,N,N'-trisubstituted sulfamides. The process involves cleavage of the tert.-butyl group from an N-tert.-butyl substituted sulfamide by contact thereof with at least one molecular equivalent of trifluoroacetic acid relative to the tert.-butyl group. The resulting product is a sulfamide bearing a hydrogen atom in the position originally occupied by the tert.-butyl group. The reaction takes place at room temperature within relatively short periods of time from about 1 to 60 minutes, and occasionally up to about 16 hrs. and consequently great latitude as to the applicability of the process in the preparation of functionally substituted sulfamides exists. The chief limitation on the selection of substituted tert.-butyl sulfamide reactants is that other organic substituents thereon be stable to trifluoroacetic acid at room temperature or at least at temperatures from about −15°C. to about 40°C., the conditions under which the reaction is carried out.

The sulfamides which may be prepared according to the process of the present invention may be represented by Formula I

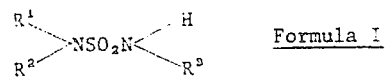

in which $R^1$ is selected from the group consisting of cycloalkyl, primary alkyl, secondary alkyl, aryl, primary aralkyl, secondary aralkyl, heterocyclic, heterocycloalkyl, substituted cycloalkyl, primary substituted alkyl, secondary substituted alkyl, substituted aryl, primary substituted aralkyl, secondary substituted aralkyl, and substituted heterocyclic groups having molecular weights in the range of from about 17 to 300 tert.-alkyl, tert.-aralkyl, and tert.-heteroalkyl groups when attached to either sulfamide nitrogen atom are subject to cleavage under the process conditions similar to the tert.-butyl group. Substituents on these organic groups which are compatible with trifluoroacetic acid under the reaction conditions of the present process include halogen, lower alkoxy of 1 to 4 carbon atoms, lower alkyl of 1 to 4 carbon atoms, sulfamyl, nitro, cyano, carboxy, lower acyl of 1 to 4 carbon atoms, hydroxy, amino, carboxamido of 1 to 4 carbon atoms, and carbalkoxy of 1 to 4 carbon atoms. $R^2$ and $R^3$ may be hydrogen or one of the foregoing groups enumerated for $R^1$. $R^1$ and $R^2$ may be joined to form with the attached nitrogen atom a heterocyclic ring.

The aryl and aralkyl terms include groups such as phenyl, naphthyl, and polynuclear aryl groups such as phenanthrenyl and anthracenyl. Examples of other aryl groups include indene, isoindene, tetralin, benzonaphthene, fluorene, etc. The aralkyl groups are those in which one of the foregoing aromatic carbocyclic substances is attached to a primary or secondary lower alkyl group having up to 4 carbon atoms which is in turn attached to the sulfamide nitrogen atom. Heterocyclic and heterocyclo-alkyl groups of the compounds prepared by the present process are analogous to the aromatic carbocyclic groups defined above but contain one or more heteroatoms and include the monocyclic, dicyclic, and tricyclic types. The heterocyclic structure may be attached directly to the sulfamide nitrogen atom or it may be attached to a primary or secondary lower alkyl group having 1 to 4 carbon atoms which in turn is attached to the sulfamide nitrogen atom. Exemplary heterocyclic groups include pyridine, pyridylethyl, pyridylbutyl, oxazine, isoxazine, oxathiazine, oxadiazine, morpholine, azepine, oxepin, thiepin, diazepine, benzofuran, furan, thiophene, pyrazole, isoimidazole, oxazole, dioxane, pyrimidine, pyridazine, pyrazine, triazine, indole, thianaphthene, benzoxazole, benzisoxazole, benzopyran, isoquinoline, quinoline, naphthyridine, quinazoline, cinnoline, etc.

Although the invention is concerned with the broad application of the process in organic chemical synthesis, it is more particularly concerned with the preparation of relatively low molecular weight compounds which are useful in the chemical process and pharmaceutical industries as intermediates and as components of compositions having various utilities such as have been mentioned above. The $R^1$, $R^2$, and $R^3$ substituents will thus have molecular weights of less than about 300 and preferably of the order of 17 to 150.

Intermediates employed in the present process have Formula II in which $R^1$, $R^2$, and $R^3$ have the same meaning as before.

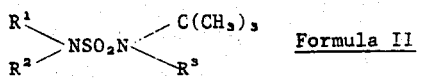

Formula II

These substances are prepared by reaction of tert.-butyl sulfamoyl chloride with a primary or secondary amine of the formula $R^1R^2NH$. The resulting substances are intermediates of Formula II in which $R^3$ is hydrogen. When $R^3$ is other than hydrogen, $R^3$ is introduced by alkylation of the sulfamide of Formula II wherein $R^3$ is hydrogen with an $R^3$ reactive ester. This is carried out by first forming a metal salt such as the sodium salt of the Formula II intermediate wherein $R^3$ is hydrogen by reaction thereof with a base such as sodium ethoxide, sodium hydroxide, sodium hydride, or other alkali metal base and thence reacting the resulting metal salt and an $R^3$ reactive ester such as methyl iodide, benzyl chloride, 2-pyrimidylmethyl chloride, or octadecyl bromide. Methods for carrying out such transformations and generally for the preparation of the intermediates of Formula II are known to those skilled in the art and are not considered part of the present invention.

While the process of this invention is applicable to the preparation of all sulfamides of the foregoing types, it is most useful for the preparation of those substances of Formula I in which $R^1$, $R^2$, or $R^3$ comprises an aromatic carbocyclic group or a heteroaromatic carbocyclic group. Such sulfamides are difficult to prepare by other methods due to the propensity of the aromatic system to undergo substitution reactions such as halogenation, sulfonation, or acylation under the conditions of prior processes.

DETAILED DESCRIPTION OF THE INVENTION

The process is carried out by contacting a sulfamide reactant containing the tert.-butyl group and at least one other organic group each attached to sulfamide nitrogen with trifluoroacetic acid at a temperature of from −15°C. to 40°C. for a sufficient time to permit the reaction to come to substantial conclusion with the removal of the tert.-butyl group. At least one chemical equivalent of trifluoroacetic acid relative to the tert.-butyl group is employed since the process amounts simply to a replacement of the tert.-butyl group of the sulfamide reactant with a hydrogen atom with the production of tert.-butyl trifluoroacetate as a by-product. Preferably, sufficient trifluoroacetic acid in addition to the one chemical equivalent necessary for the reaction is employed to provide a fluid reaction mixture and to serve as reaction medium. Trifluoroacetic acid is a relatively inexpensive, commercially available material which can be recovered by distillation at the end of the reaction and reused. Technical grade trifluoroacetic acid having a boiling point range of about 71°–73°C. may be employed. It, therefore, serves in a very satisfactory manner as reaction medium. It is not essential that a homogeneous reaction mixture be employed. That is, it is not necessary to employ sufficient trifluoroacetic acid to dissolve the tert.-butyl sulfamide reactant, although most of the sulfamide reactants are quite soluble therein. Some of the sulfamide reactants, however, are relatively insoluble in trifluoroacetic acid and it is not possible in those instances to provide a solution thereof in the trifluoroacetic acid with practical volumes of material. This is not necessary. On a laboratory scale, it has been found convenient to employ from about 5 to about 15 ml. of trifluoroacetic acid for each gram of sulfamide reactant treated.

Heating of the reaction mixture is not necessary to accelerate the process nor is it generally necessary to cool the reaction mixture for the purposes of moderating the reaction, but in some instances a slightly elevated or slightly reduced temperature may be convenient. The process is preferably carried out at ambient temperature in the range of from about 20° to about 30°C. This temperature range is chosen for purposes of convenience and economy.

Contact of the sulfamide reactant with trifluoroacetic acid during the reaction period is normally affected by mechanical stirring when the sulfamide reactant is insoluble or only partially soluble in the trifluoroacetic acid. Generally reaction periods of from 1 to 16 hr. are employed, and most frequently from 1 to 5 hr. However, in some instances reaction periods of as little as 1 minute suffice.

DESCRIPTION OF SPECIFIC EMBODIMENTS

The following procedures illustrate the process as applied to p-aminoacetophenone which is first acylated with tert.-butylsulfamoyl chloride to provide the sulfamide reactant of Formula II wherein $R^1$ is 4-acetylphenyl and $R^2$ and $R^3$ are hydrogen which is then cleaved with trifluoroacetic acid to provide N-(4-acetylphenyl)sulfamide. These procedures are applied to the starting materials listed in Table I to provide the products whose formulas are shown in the table. The melting point, crystallization solvent, percent yield and analyses of these products are shown in Table II.

TABLE I. PRODUCTS OF FORMULA I ACCORDING TO PROCEDURES 1 AND 2

| Example No. | R¹ | R² | R³ | Starting Materials |
|---|---|---|---|---|
| 1 |  | H | H | aniline, tert.-butylsulfamoyl chloride |
| 2 | 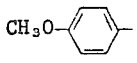 | H | H | anisole, tert.-butylsulfamoyl chloride |
| 3 | 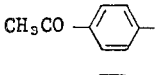 | H | H | p-aminoacetophenone, tert.-butylsulfamoyl chloride |
| 4 | 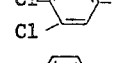 | H | H | 3,4-dichloroaniline, tert.-butylsulfamoyl chloride |
| 5 |  | H | H | 2-phenethylamine, tert.-butylsulfamoyl chloride |
| 6 | 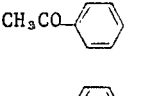 | $CH_3$ | $CH_3$ | N-(4-acetylphenyl)-N'-(tert.-butyl)sulfamide, methyl iodide* |
| 7 | 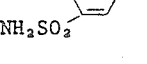 | H | H | 2-chloro-5-aminobenzenesulfon amide, tert.-butylsulfamoyl chloride |
| 8 | 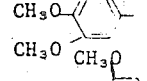 | H | H | 3,4-dimethoxyaniline, tert.-butylsulfamoyl chloride |
| 9 | 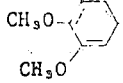 | H | H | 3,4,5-trimethoxyaniline, tert.-butylsulfamoyl chloride |

*The sulfamide reactant of Formula II for Example 3 is methylated in acetone as reaction medium in the presence of potassium carbonate during a 48 hr. reflux period.

TABLE II

PHYSICAL DATA FOR EXAMPLES 1–9

| Example No. | % Yield | M.P., °C | Solvent | Analyses Found |
|---|---|---|---|---|
| 1 | 85* | 108–110 | $C_6H_6$ | Chem. and Ind., 873 (1962) |
| 2 | 71 | 135–136 | $C_6H_6$ | Chem. and Ind., 873 (1962) |
| 3 | 95 | 160–162 | EtOH | C, 45.04; H, 4.84; N, 13.18. |
| 4 | 87 | 104.5–108 | $C_6H_6$ | C, 30.13; H, 2.71; N, 11.54. |
| 5 | 63 | 62–63 | $C_6H_6$ | Chem. Abstracts., 62, 489e (1965) |
| 6 | 87 | 119.5–121.5 | $C_6H_6$ | C, 49.42; H, 5.87; N, 11.35. |
| 7 | 70 | 197–198 | Acetonitrile | C, 25.38; H, 2.76; N, 14.74. |
| 8 | 78 | 142.5–146.5 | Isopropanol | C, 41.19; H, 5.34; N, 11.92. |
| 9 | 69 | 162–164 | Isopropanol | C, 41.59; H, 5.52; N, 10.36. |

*When the reaction was repeated at −15°C, the yield was reduced to 59% employing a 24 hr. reaction period, and unreacted starting material was recovered.

Procedure 1. Sulfamoylation tert.-Butylsulfamoyl chloride (3.4 g., 0.02 mole) is added dropwise to a solution of p-aminoacetophenone (3.4 g., 0.02 mole) and triethylamine (2.0 g., 0.02 mole) in 1.5 l. of ether at −50°C. The mixture is stirred for 3 hr. during which time it is allowed to warm to room temperature. The mixture is made acidic with ethanolic hydrogen chloride and the insoluble collected. The insolubles are washed with water and recrystallized from isopropanol to give 4.2 g. (78%) of N-(4-acetylphenyl)-N'-(tert.-butyl)sulfamide.

Procedure 2. Trifluoroacetic Acid Cleavage

A solution of N-(4-acetylphenyl)-N'-(tert.-butyl)sulfamide (3.0 g., 0.011 mole) in 50 ml. of trifluoroacetic acid is stirred for 5 hr. at room temperature. The solution is concentrated in vacuo and the residue recrystallized from ethanol to give 2.3 g. (95%) of N-(4-acetylphenyl)sulfamide.

The following are converted to N-(tert.-butyl)sulfamide reactants according to Procedure 1, and thence cleaved to yield the desired primary or secondary sulfamides by Procedure 2.

| Amine Reactant | Sulfamide Product |
|---|---|
| Isopropylamine | N-isopropylsulfamide |
| N-methyl-n-propylamine | N-isopropyl-N-methylsulfamide |
| p-Toluidine | N-(4-methylphenyl)sulfamide |
| N-methylaniline | N-methyl-N-phenylsulfamide |
| α-naphthylamine | N-(α-naphthyl)sulfamide |
| N-methyl-α-naphthylamine | N-methyl-N-(α-naphthyl)sulfamide |
| Cyclohexylamine | N-cyclohexylsulfamide |
| α-Methylphenethylamine | N-(2-phenylpropyl)sulfamide |
| 3-aminopyridine | 3-sulfamoylaminopyridine |
| 8-aminoquinoline | 8-sulfamoylaminoquinoline |
| 5-aminoinodole | 5-(sulfamoylamino)indole |
| 5-aminoisoquinoline | 5-sulfamoylaminoisoquinoline |
| p-aminobiphenyl | N-(4-biphenylyl)sulfamide |
| 2-phenylcyclopropylamine | N-(2-phenylcyclopropyl)sulfamide |
| 3-aminopropionitrile | N-(2-cyanoethyl)sulfamide |
| N-(3-aminopropyl)morpholine | N-(3-morpholinopropyl)sulfamide |
| N-(3-aminopropyl)-2-pyrrolidinone | N-(3-sulfamoylaminopropyl)-2-pyrrolidinone |
| α-methylphenoxyethylamine | N-(2-phenoxypropyl)sulfamide |
| p-aminobenzonitrile | N-(4-cyanophenyl)sulfamide |
| ethyl p-aminobenzoate | ethyl p-(sulfamoylamino)benzoate |
| p-benzyloxyaniline | N-(4-hydroxyphenyl)sulfamide |
| p-aminobenzamide | p-sulfamoylaminobenzamide |
| p-chlorophenethylamine | N-[2-(4-chlorophenyl)ethyl]sulfamide |
| p-methoxy-α-methylphenethylamine | N-[2-(4-methoxyphenyl)propyl]sulfamide |
| 3-amino-N-ethylpiperidine | N-ethyl-3-sulfamoylaminopiperidine |
| 3-amino-2,6-dimethoxypyridine | 2,6-dimethyl-3-sulfamoylaminopyridine |
| p-aminoacetanilide | 4-sulfamoylaminoacetanilide |
| p-nitroaniline | N-(4-nitrophenyl)sulfamide |
| salicylic acid | 2-sulfamoylaminobenzoic acid |

The time period for completion of the process can be determined by measurement of the nuclear magnetic resonance spectrum of the reaction mixture. Downfield shift of the tert.-butyl peak as the reaction proceeds is evident as the tert.-butylsulfamide is consumed and tert.-butyl trifluoroacetate is produced. The rate of reaction can be determined by integrating and comparing the areas under the original tert.-butyl sulfamide peak and the downfield peak of tert.-butyl trifluoroacetate which forms as the reaction proceeds at successive intervals.

Procedure 3. Determination of Reaction Rate

A suitable nuclear magnetic spectrometer is employed. In the experiments described below, a Varian T-60 was used to determine the half-lives of various intermediates of Formula II used in the foregoing examples.

A sample of the amide is added to prewarmed (37°C.) trifluoroacetic acid and this solution is immediately inserted into the pretuned instrument. Scans of the tert.-butyl region are taken every 30 seconds for the first 5 minutes and every minute thereafter until the cleavage is 95% complete. The integral of the tert.-butyl amide species at time $t$ was directly proportional to the concentration [a] and the starting concentration [a°] was determined by the sum of the tert.-butyl integrals. The half-life, $t^{1/2}$, was obtained from the slope of a plot of $-\log[a]$ vs. t.

$$t^{1/2} = \log 2/\text{slope}$$

The following results were obtained.

TABLE III

REACTANT HALF LIFE

| Example No. | $t^{1/2}$ (min) |
|---|---|
| 1 | 4.3 |
| 2 | 4.3 |
| 3 | 27.5 |
| 4 | 12.5 |
| 5 | 6.4 |
| 6 | <0.5 |

What is claimed is:

1. The process for preparing an N-substituted sulfamide bearing at least one hydrogen atom and from 1 to 3 organic groups attached to the sulfamide nitrogen atoms thereof, said organic groups being stable under the reaction conditions to trifluoroacetic acid and having molecular weights of from 17 to 300 which comprises contacting a sulfamide bearing at least one tert.-butyl group and said organic groups on the sulfamide nitrogen atoms thereof with at least a molecularly equivalent amount of trifluoroacetic acid relative to said tert.-butyl group at a temperature of from −15°C. to 40°C. for a time period sufficient to result in replacement of said tert.-butyl group with hydrogen.

2. The process of claim 1 wherein said organic groups are selected from the group consisting of cycloalkyl, primary alkyl, secondary alkyl, aryl, primary aralkyl, secondary aralkyl, heterocyclic, heterocyclic wherein one of said sulfamide nitrogens is part of the heterocyclic ring, heterocycloalkyl, substituted cycloalkyl, primary substituted alkyl, secondary substituted alkyl, substituted aryl, primary substituted aralkyl, secondary substituted aralkyl, and substituted heterocyclic groups each wherein the substituent of said substituted groups is selected from the group consisting of halogen, lower alkoxy, lower alkyl, sulfamyl, nitro, cyano, carboxy, carbalkoxy, hydroxy, amino, carboxamide, and lower acyl.

3. The process of claim 1 wherein sufficient trifluoroacetic acid is used to provide a fluid reaction mixture and serve as reaction medium.

4. The process of claim 1 wherein about 5 to 15 ml. of trifluoroacetic acid is employed for each gram of said sulfamide reactant.

5. The process of claim 1 when carried out at ambient temperature in the range of from about 20° to 30°C.

6. The process of claim 1 wherein at least one of said organic groups is an aromatic carbocyclic or heterocyclic group.

7. The process of claim 1 wherein N-(4-acetylphenyl)-N'-(tert.-butyl)sulfamide is employed as starting material and N-(4-acetylphenyl)sulfamide is produced.

* * * * *